Jan. 27, 1925.   1,524,468
C. A. ALDEN
BOLT HEAD LOCK AND NUT HOLDER
Filed April 6, 1923
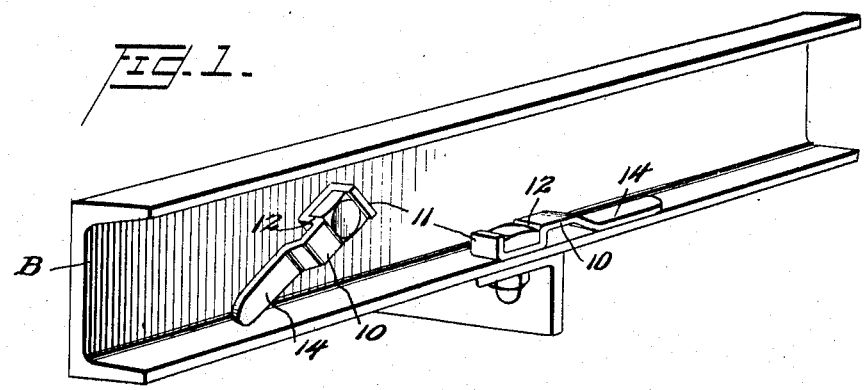
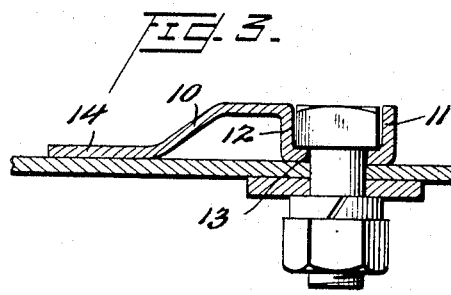
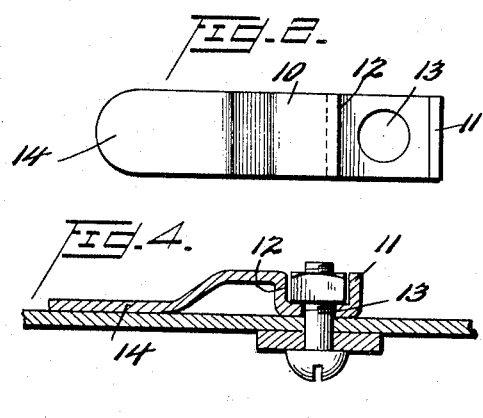
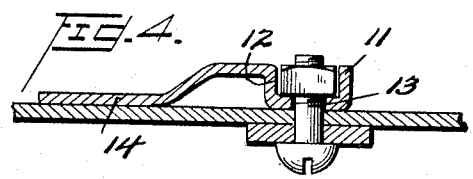
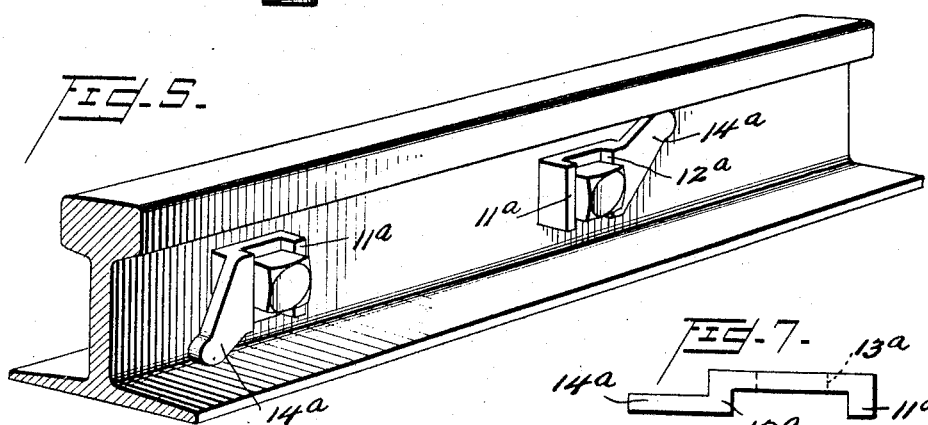
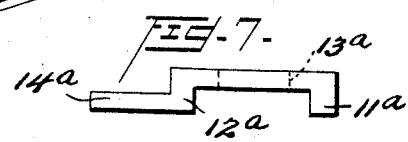
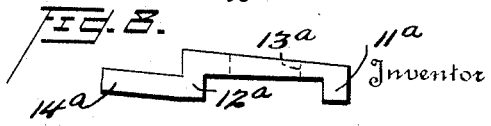
Inventor
C. A. Alden
By Watson, Coit, Morse & Grindle
Attorney Patented Jan. 27, 1925.

1,524,468

UNITED STATES PATENT OFFICE.

CHARLES A. ALDEN, OF STEELTON, PENNSYLVANIA.

BOLT-HEAD LOCK AND NUT HOLDER.

Application filed April 6, 1923. Serial No. 630,373.

*To all whom it may concern:*

Be it known that I, CHARLES A. ALDEN, a citizen of the United States, and a resident of Steelton, Dauphin County, State of Pennsylvania, have invented new and useful Improvements in Bolt-Head Locks and Nut Holders, of which the following is a specification.

My invention relates to a bolt head lock or nut holder. The object of the invention is to provide a device which can be applied to a bolt head or nut to hold the same from turning while a nut is threaded on the bolt or the bolt threaded into a nut. The invention is of particular utility in applying a bolt to parts so located that both ends of the bolt are not accessible at the same time to a workman. In such case my device may be applied to the head of the bolt or to a nut on the bolt which is held from rotating while the nut is threaded on the bolt or similarly when the bolt is rotated to thread the same into the nut. A further object of the invention is to provide a device of this kind which is simple in construction, cheap and easy to manufacture.

The invention is illustrated in different forms in the accompanying drawings, in which:

Fig. 1 is a perspective view showing the device applied to bolts used for securing beams together;

Fig. 2 is a front view of the device made in the form shown in Figure 1;

Figs. 3 and 4 are sectional views, the former illustrating the device used for holding the head of a bolt and the latter for holding a nut;

Fig. 5 is a perspective view showing a slightly modified form of the device applied to a railroad rail or similar beam;

Fig. 6 is a front view of the form of device illustrated in Figure 5;

Figs. 7 and 8 are views of the device illustrated in Figure 5, these views showing different ways in which the device may be made.

Referring to the drawings in detail and particularly to Figures 1 to 4 inclusive, the numeral 10 indicates generally a device embodying my invention. The device as illustrated in these figures is preferably formed of a flat strip of metal, one end of which is bent up to form a wall 11 against which one side of the bolt head or nut is adapted to rest. The strip of metal intermediate its ends is also bent to form a second wall 12 which is spaced from the wall 11 a sufficient distance to permit the head of a bolt or nut to rest between them. The walls 11 and 12 form, in effect, a recess or groove for receiving the head of a bolt or nut. The bottom of this recess is provided with an opening 13 through which the shank of the bolt extends.

The device, as illustrated in Figures 1 to 4 inclusive, is further provided with an arm or extension 14 which is of considerable length and which is formed by bending the strip of metal into such position that the end thereof is in substantially the same plane as the bottom of the recess between the walls 11 and 12. This arm or extension 14, it will be understood, serves to prevent rotary movement of the device since it is of such length as to contact with some portion of the object in which the bolt is being inserted. For example in the form shown in Figure 1, such arm would contact with a flange or other part of the beam B and thus prevent the head of the bolt from rotating any considerable distance when the nut is applied to the opposite end of the same, or prevent rotation of the nut when the bolt is threaded into it as shown in Figure 4.

The form of device illustrated in Figures 5 to 8 inclusive is similar to that already described, being provided with walls 11ª and 12ª spaced apart to form a recess for receiving the head of a bolt or nut and being provided with an opening 13ª through which the shank of the bolt extends. In this form of the device the contact arm 14ª extends from the body in a somewhat different direction from that heretofore described but serves identically the same purpose. For example as illustrated in Figure 5, such arm would contact with the flange or head of the rail to prevent rotation of the bolt when a nut is applied thereto. If desired this form of device may be provided on its rear face with a flat surface parallel to the bottom of the head or nut receiving recess and such a construction is illustrated in Figure 7. In some cases it may be desirable to bevel or cant the rear face of the device with reference to the bottom of the recess so as to produce a binding effect on the shank of the bolt when the same is drawn tightly against the device. An arrangement of this kind is illustrated in Figure 8.

Referring to the modifications of my invention shown in Figs. 5 to 8, inclusive, in these views, I show a locking device for a bolt and which is particularly suitable for railway use.

In these views, I show a locking device for a bolt comprising a channel portion for engagement with a bolt head and an arm integral with the channel portion to limit turning movement. The channel portion is comprised by outwardly-extending walls 11ª and 12ª joined by a bottom or web portion provided with an aperture 13ª for the shank of a bolt.

The arm 14ª extends laterally and obliquely with respect to the wall 12ª and it is off-set outwardly with respect to the bottom of the channel portion. The oblique extension of the arm 14ª to a point beyond a transverse plane passing through the adjacent end of the channel portion permits of the locking device being employed in positions affording rather close clearance while at all times assuring a maximum resisting moment to turning. Assuming the device to be placed on the shank of a bolt and the bolt turned slightly, the rounded point of the arm 14ª is the first portion of the locking device to come in contact with a flange.

The oblique extension of the arm not only assures that the point shall be the first part to contact with a flange, but it also affords a very strong construction in that it provides resistance to turning largely by compression; and to this end the arm tapers outwardly from the wall 12ª to assure ample material in compression to afford a good resisting moment. This is particularly important if the locking device is made of cast iron.

By having the arm 14ª off-set outwardly from the channel portion, it is assured that the bottom surface of the channel portion shall be firmly positioned against a web surface and the arm shall be far enough out to avoid fillets and obtain a firm seating against a flange. This is particularly advantgeous if the locking device is made of cast iron for the reason that the possibility of wedging against a fillet and possibly cracking owing to deflection is avoided.

It will thus be seen that my invention provides a device which can be easily and quickly applied to the head or nut of a bolt and which will effectively prevent turning of such part while a nut is applied to the other end of the bolt, or the bolt rotated into the nut. With my device it is therefore unnecessary for a workman to take hold of both ends of the bolt and the device is therefore of particular utility where, on account of the arrangement of parts, it is impossible for a workman to reach both ends of the bolt at the same time. Furthermore, the device is simple in construction, particularly the form illustrated in Figures 1 to 4 inclusive which can be made rapidly and cheaply from flat strips of metal by merely pressing or stamping the same into the desired shape.

Having thus described the invention what is claimed as new and desired to be secured by Letters Patent is:

1. A non-deformable nut or head lock for a bolt, which is adapted to extend through the web of a flanged rail or beam comprising a nut or head engaging member having a depression provided with a bottom surface for engagement by the bottom surface of the head or nut and with parallel interior side surfaces for engagement with parallel side surfaces of the head or nut, the bottom of said depression being provided with an aperture to receive the shank of a bolt, and an arm member integral with the nut or head engaging member and adapted to engage the flange of a beam or rail to limit turning of the head or nut.

2. A non-deformable nut or head lock for a bolt, which is adapted to extend through the web of a flanged rail or beam, comprising a nut or head engaging member defined by a channel portion whose web is apertured to receive a bolt shank and whose flanges are adapted to engage parallel faces of a head or nut and an arm member integral with and extending laterally from one of the flanges for engagement with the flange of a rail or beam to prevent turning of the head or nut.

3. As an article of manufacture, a nut or bolt lock of the rigid and non-deformable type comprising a nut or head engaging member including a bottom portion having an aperture therein for a bolt shank and parallel wall portions extending upwardly from the bottom portion and an arm member integral with one wall portion and extending laterally therefrom.

4. A head lock for a bolt adapted to extend through the web of a flanged rail or beam comprising a channel portion having side walls to engage opposed side faces of a bolt head and a bottom adapted to engage with a rail or beam web and having an aperture to receive a bolt shank and an arm integral with one of the walls and extending laterally and obliquely therefrom for contacting with a rail or beam flange to limit turning of a bolt.

5. A head lock for a bolt adapted to extend through the web of a flanged rail or beam comprising a channel portion having side walls to engage opposed side faces of a bolt head and with a bottom to engage with a rail or beam web and having an aperture to receive a bolt shank and an arm integral with one of the walls and off-set outwardly from said bottom for contacting with a rail or beam flange to limit turning of a bolt.

6. A head lock for a bolt adapted to extend through the web of a flanged rail or beam comprising a channel portion having side walls to engage opposed side faces of a bolt head and with a bottom to engage with a rail or beam web and having an aperture to receive a bolt shank and an arm integral with one of the walls, extending laterally and obliquely therefrom to a point beyond the plane passing through the adjacent end of the channel portion, and being off-set outwardly from said bottom for contacting with a rail or beam flange to limit turning of a bolt.

In testimony whereof I hereunto affix my signature.

CHARLES A. ALDEN.